(12) United States Patent
Schraff

(10) Patent No.: US 8,851,263 B2
(45) Date of Patent: Oct. 7, 2014

(54) PARKING INTERLOCK DEVICE OF A VEHICULAR TRANSMISSION

(75) Inventor: Berthold Schraff, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 189 days.

(21) Appl. No.: 13/586,926

(22) Filed: Aug. 16, 2012

(65) Prior Publication Data

US 2013/0056327 A1 Mar. 7, 2013

(30) Foreign Application Priority Data

Sep. 6, 2011 (DE) .......................... 10 2011 082 169

(51) Int. Cl.
*F16H 63/34* (2006.01)

(52) U.S. Cl.
CPC .................................. *F16H 63/3416* (2013.01)
USPC .......................... 192/219.5; 74/411.5; 188/31

(58) Field of Classification Search
CPC .................................................. F16H 63/3416
USPC ...................................................... 192/219.5
See application file for complete search history.

(56) References Cited

U.S. PATENT DOCUMENTS

| | | | |
|---|---|---|---|
| 4,519,483 A | 5/1985 | Schlicker | |
| 2006/0070839 A1* | 4/2006 | Sugano et al. | 192/219.5 |
| 2009/0114788 A1* | 5/2009 | Gilley | 248/309.2 |
| 2011/0011204 A1 | 1/2011 | Ueno et al. | |
| 2011/0015036 A1* | 1/2011 | Watanabe et al. | 477/92 |
| 2012/0103752 A1* | 5/2012 | Kim | 192/219.5 |
| 2012/0145512 A1* | 6/2012 | Kim et al. | 192/219.5 |

FOREIGN PATENT DOCUMENTS

| | | |
|---|---|---|
| DE | 32 43 308 A1 | 6/1983 |
| DE | 199 33 618 A1 | 1/2001 |
| DE | 10 2008 011 115 A1 | 8/2009 |
| JP | 2005-282722 A | 10/2005 |
| JP | 2006-266452 A | 10/2006 |
| WO | 2009/106238 A1 | 9/2009 |

OTHER PUBLICATIONS

German Search Report Corresponding to 10 2011 082 169.4, dated Jul. 4, 2012.

* cited by examiner

*Primary Examiner* — Richard M. Lorence
(74) *Attorney, Agent, or Firm* — Davis & Bujold, PLLC; Michael J. Bujold

(57) ABSTRACT

A parking lock device of a motor vehicle transmission comprising a transmission housing (11) with a housing wall (11a), a parking lock gearwheel (1), a parking lock pawl (2), a parking lock bolt (3) for mounting the parking lock pawl (2) and a blocking element (5). A carrier plate (7) is arranged alongside the parking lock pawl (2) and is fixed to the transmission housing (11), and the parking lock bolt (3) is held, on one side, by the carrier plate (7) and, on the other side, by the transmission housing (11).

15 Claims, 2 Drawing Sheets

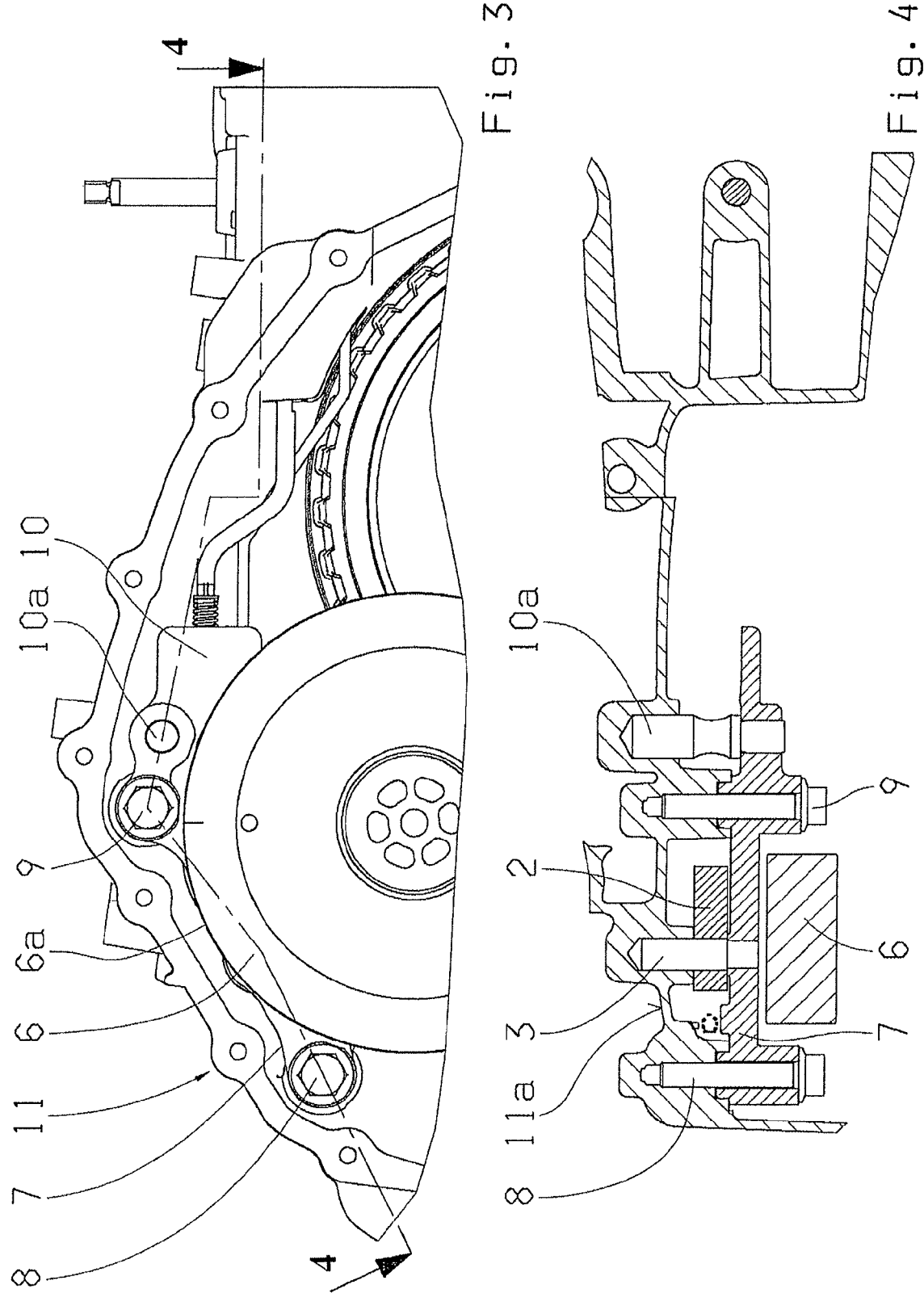

PARKING INTERLOCK DEVICE OF A VEHICULAR TRANSMISSION

This application claims priority from German patent application serial no. 10 2011 082 169.4 filed Sep. 6, 2011.

FIELD OF THE INVENTION

The invention concerns a parking interlock device of a vehicular transmission.

BACKGROUND OF THE INVENTION

Parking lock devices for automatic transmissions of motor vehicles are widely known. As a rule a parking lock device comprises a parking lock pawl which engages in a parking lock gearwheel and immobilizes it. The parking lock gearwheel is mechanically connected to an output shaft of the transmission and thus prevents the vehicle from rolling away. The parking lock pawl is mounted on a parking lock bolt, which as a rule is fixed on the transmission housing. The parking lock device also comprises a blocking element, for example a detent, by means of which when the parking lock pawl is engaged in the parking lock gearwheel it is immobilized relative to the transmission housing.

For example, such a parking lock device is known from DE 199 33 618 A1 by the present applicant. From this it can be seen that both the parking lock bolt and the detent are supported directly relative to the transmission housing.

It is also known to support a parking lock bolt indirectly relative to the transmission housing, i.e. by means of an additional component. From DE 32 43 308 C2 a parking lock device is known, in which the parking lock pawl is supported by the parking lock bolt on a yoke, the yoke being fixed on a transmission housing by means of fixing bolts diametrically opposite one another. The yoke consists of two mutually parallel steel plates with the locking pawl between them.

From JP 2006 266 452 A, a similar parking lock device is known, in which the parking lock pawl is located between two mutually parallel plates and is supported on both plates. The parallel plates are connected to one another and also form a yoke, which is attached to the transmission housing.

SUMMARY OF THE INVENTION

The purpose of the present invention, with a parking lock device of the type mentioned to begin with, is to achieve as space-saving and compact an arrangement as possible of the parking lock pawl in relation to the parking lock gearwheel. In particular this should be achieved for an arrangement in which another gearwheel with larger diameter is positioned directly adjacent to the parking lock gearwheel.

According to a first aspect of the invention, alongside the parking lock pawl, i.e. parallel thereto, there is arranged a carrier plate which is connected to the transmission housing, and the parking lock bolt on which the parking lock pawl is mounted to pivot is supported on one side by the carrier plate and on the other side in the transmission housing. Thus, the parking lock pawl is positioned and can pivot between the carrier plate and a wall of the transmission housing. In this way, when fitting space is restricted the parking lock bolt can be positioned relatively close to the parking lock gearwheel. The carrier plate forms, as it were, a second housing wall parallel to the first, so allowing the parking lock bolt to be supported at both ends in such manner that very little fitting space is needed in its axial direction. This allows the fitting space immediately adjacent to the parking lock pawl to be used for other structures.

In a preferred embodiment the carrier plate is screwed to the transmission housing by means of two fixing bolts arranged on either side of the parking lock bolt. Thus, the parking lock bolt and the parking lock pawl are located between the two fixing bolts, thus giving a compact structure.

In a further preferred embodiment, a guiding and supporting device for the blocking element of the locking pawl is integrated in the carrier plate. The structurally integrated guiding and supporting device, on the one hand, enables the detent to be introduced and, on the other hand, allows it to be supported when the parking lock is engaged, i.e. when the parking lock pawl is fixed in place. This has the advantage that the transmission housing is made more simple because the guiding device is formed on the carrier plate and made integrally with it.

In another preferred embodiment, the supporting device comprises a supporting bolt that is held at one end in a bore in the carrier plate and at the other end in a bore of the transmission housing, and is thus mounted on both sides. The detent rests against the supporting bolt when the parking lock is engaged.

According to another aspect of the invention, the carrier plate is arranged between a spur gear that is positioned coaxially with the parking lock gearwheel and the parking lock pawl, so that the parking lock bolt is supported at one end in the carrier plate and at the other end in a wall of the transmission housing. This gives the advantage that the parking lock bolt can be mounted on both sides even though the fitting space available is very restricted because of the adjacent spur gear.

In preferred embodiments the fixing bolts for the carrier plate are located outside the circumference of the spur gear and the parking lock bolt is located within the circumference of the spur gear. This allows the mounting of the parking lock pawl to be located close to the circumference of the parking lock gearwheel. The fitting space severely restricted by the adjacent spur gear can therefore be used to the best effect.

BRIEF DESCRIPTION OF THE DRAWINGS

An example embodiment of the invention is illustrated in the drawing and will be described in greater detail below, so that further features and/or advantages can emerge from the description and/or the drawings, which show:

FIG. 3: A view in the axial direction toward the spur gear and a carrier plate, and FIG. 4: A section through the carrier plate, taken along the section line 4-4 in FIG. 3, and its arrangement between the spur gear and the parking lock pawl.

DETAILED DESCRIPTION OF THE PREFERRED EMBODIMENTS

Figure 1:
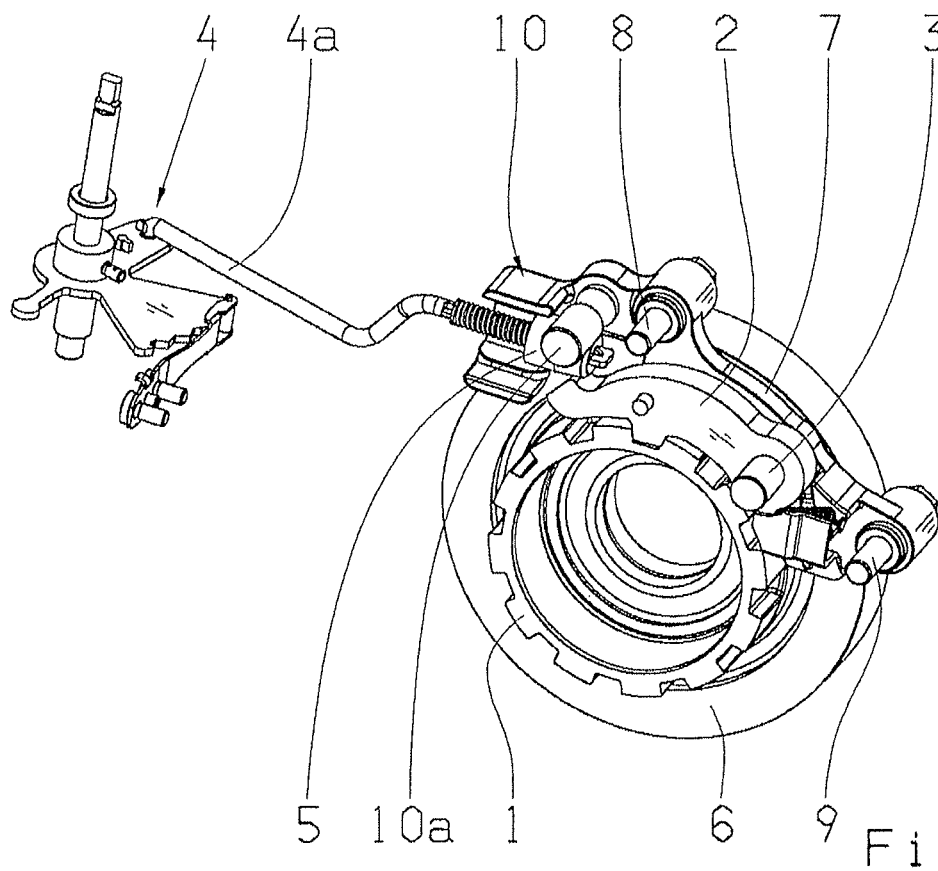
FIG. 1: A parking lock device with parking lock gearwheel and a coaxially arranged spur gear, shown in perspective.

FIG. 1 shows a parking lock device, which comprises a parking lock gearwheel 1, a parking lock pawl 2, also called just the pawl 2 for short in what follows, and a parking lock bolt 3 for mounting the parking lock pawl 2. The parking lock device also comprises an actuating mechanism 4 with a connecting rod 4a at the end of which is arranged a blocking element in the form of a detent 5 for blocking the pawl 2. The parking lock gearwheel 1 is connected to a transmission output shaft (not shown) of an automatic transmission of a motor vehicle. Thus, when the parking lock is engaged the wheels of the motor vehicle are mechanically blocked. Coaxially with the parking lock gearwheel 1 is arranged a spur gear 6 which is part of a spur drive (not shown). Between the parking lock pawl 2 and the spur gear 6 is arranged a carrier plate 7, in which two fixing bolts 8, 9 are inserted. The end of the parking lock bolt 3 that is not in view is also mounted in the carrier plate 7. On the carrier plate 7 is arranged—as an integral part thereof—a guiding and supporting device 10 for the detent 5. The device 10 comprises a supporting bolt 10*a* against which the pawl 2 rests via the detent 5 when the parking lock is engaged.

Figure 2:
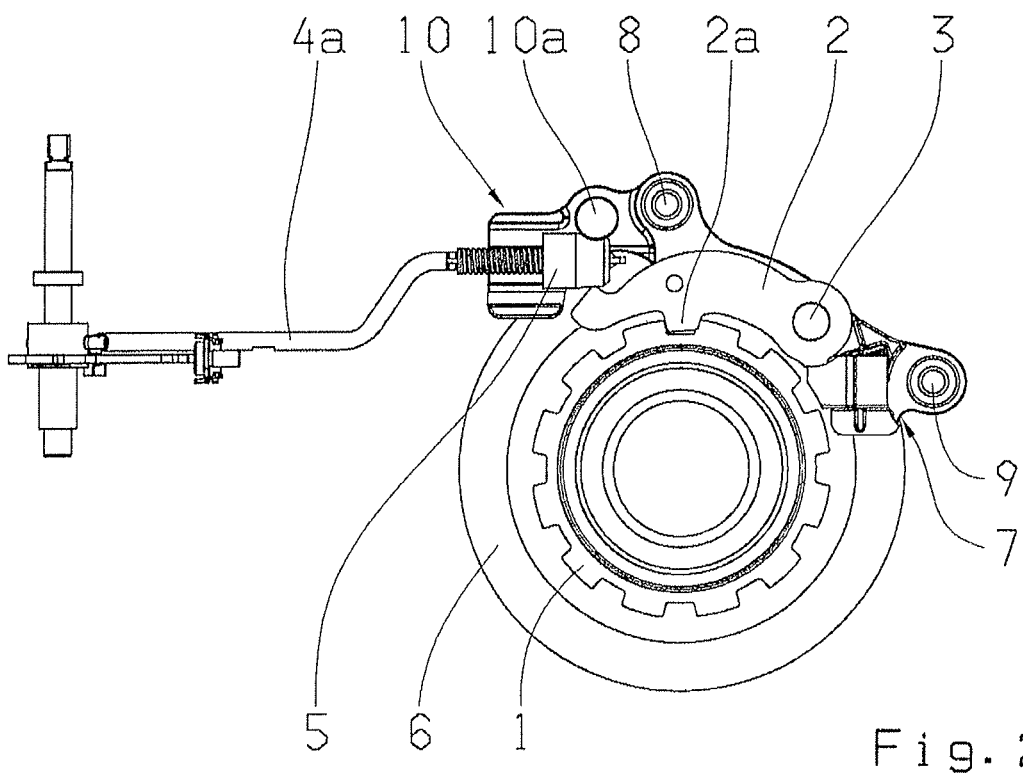
FIG. 2: The parking lock device of FIG. 1, viewed in the axial direction toward the parking lock gearwheel.

FIG. 2 shows the parking lock device in an engaged condition and viewed in the axial direction toward the parking lock gearwheel 1 and the parking lock pawl 2 with a pawl tooth 2*a*. In the disengaged condition of the parking lock (not shown) the pawl tooth 2*a* is not within a tooth gap (not indexed) of the parking lock gearwheel 1, but in a "tooth-on-tooth" position. From the disengaged condition of the parking lock (not shown) the detent 5 is displaced to the right in the drawing, so pressing against the parking lock pawl 2, which pivots about the parking lock bolt 3 downward in the drawing (counterclockwise) so that the pawl tooth 2*a* can fall into a tooth gap. The detent 5 is then supported against the supporting bolt 10*a*.

FIG. 3 shows a view in the axial direction toward the spur gear 6, which has a circumference 6*a* and a diameter substantially larger than the parking lock gearwheel 1. The spur gear 6, which is arranged in a transmission housing 11, has the effect of restricting the fitting space available. The carrier plate 7 is mostly covered by the spur gear 6 and only the fixing bolts 8, 9 and the guiding and supporting device 10 with its supporting bolt 10*a* are visible in this view.

FIG. 4 shows a section along the section line 4-4 in FIG. 3, i.e. the section is taken in more than one plane, through the fixing bolts 8, 9, the parking lock bolt 3 and the supporting bolt 10*a*. The carrier plate 7 is attached firmly to a housing wall 11*a* of the transmission housing 11 by means of the two fixing bolts 8, 9 in the form of tension screw-bolts. The supporting bolt 10*a* is inserted on one side into a bore in the carrier plate 7 and on the other side into a blind-hole bore of the housing wall 11*a*. The parking lock bolt 3 passes through the parking lock pawl 2 and is held on one side in a bore in the carrier plate 7 and on the other side in a blind-hole bore of the housing wall 11*a*. Thus the parking lock bolt 3 is supported at both ends, which enables exact guiding of the parking lock pawl 2.

INDEXES

1 Parking lock gearwheel
2 Parking lock pawl
2*a* Pawl tooth
3 Parking lock bolt
4 Actuating mechanism
4*a* Connecting rod
5 Detent
6 Spur gear
6*a* Circumference
7 Carrier plate
8 Fixing bolt
9 Fixing bolt
10 Guiding and supporting device
10*a* Supporting bolt
11 Transmission housing
11*a* Housing wall

The invention claimed is:

1. A parking lock device, for a motor vehicle transmission, comprising:
   a transmission housing (11) having a housing wall (11*a*),
   a parking lock gearwheel (1) which rotates about an axis,
   a parking lock pawl (2),
   a parking lock bolt (3) for mounting the parking lock pawl (2), and
   a detent (5),
   wherein a carrier plate (7), fixed to the transmission housing (11), is arranged on one side of the parking lock pawl (2), and the parking lock bolt (3) is held, at one end, in the carrier plate (7) and, at another end, in the transmission housing (11);
   a spur gear (6) which is arranged coaxially with the parking lock gearwheel (1), and the parking lock bolt (3) defines an axis that is parallel to the axis of the parking lock gearwheel and is located within a circumference (6*a*) defined by the spur gear (6).

2. The parking lock device according to claim 1, wherein the carrier plate (7) is fixed to the housing wall (11*a*) of the transmission housing (11) by at least two fixing bolts (8, 9) that are arranged on either side of the parking lock bolt (3).

3. The parking lock device according to claim 1, wherein the carrier plate (7) comprises a guiding and supporting device (10).

4. The parking lock device according to claim 3, wherein the guiding and supporting device (10) comprises a supporting bolt (10*a*) which is held, at one end, in the carrier plate (7) and, at the other end, in the housing wall (11*a*).

5. A parking lock device, for a motor vehicle transmission, comprising:
   a transmission housing (11) having a housing wall (11*a*),
   a parking lock gearwheel (1) which defines an axis,
   a parking lock pawl (2),
   a parking lock bolt (3) for mounting the parking lock pawl (2),
   a detent (5), and
   a spur gear (6) which is arranged coaxially with and adjacent to the parking lock gearwheel (1) and has an outer diameter that is larger than an outer diameter of the parking lock gearwheel (1),
   a carrier plate (7) being arranged between the spur gear (6) and the parking lock pawl (2),
   the carrier plate (7) being supported by the transmission housing (11), and
   the parking lock bolt (3) being supported, on one side, by the carrier plate (7) and, on the other side, by the transmission housing (11) and arranged such that an axis defined by the parking lock bolt is parallel to the axis of the parking lock gearwheel and is located within the outer diameter of the spur gear.

6. The parking lock device according to claim 5, wherein the carrier plate (7) is fixed to the housing wall (11*a*) of the transmission housing (11) by fixing bolts (8, 9), and the fixing bolts (8, 9) are located outside a circumference (6*a*) defined by the spur gear (6).

7. The parking lock device according to claim 6, wherein the parking lock bolt (3) is located inside the circumference (6*a*) defined by the spur gear (6).

8. The parking lock device according to claim 5, wherein the carrier plate (7) comprises a guiding and supporting device (10).

9. The parking lock according to claim 5, wherein a supporting device (10) comprises a supporting bolt (10*a*) which is supported, on one side, by the carrier plate (7) and, on the other side, by the housing wall (11*a*).

10. A parking lock device for a motor vehicle transmission, the device comprises:

- a parking lock gearwheel (1) having a plurality of teeth and a gap located between pairs of adjacent teeth;
- a parking lock pawl (2) having a pawl tooth (2*a*) pivotally supported by a parking lock bolt (3);
- an actuating mechanism (4) which actuates a detent (5),
- the detent (5) engaging and pivoting the parking lock pawl (2) between an engaged condition and a disengaged condition, the pawl tooth (2*a*) of the parking lock pawl (2) being positioned within a gap between two adjacent teeth when the parking lock pawl (2) is in the engaged condition;
- a carrier plate (7) being fixed to a wall (11*a*) of a transmission housing (11) by fixing bolts (8, 9), one axial end of the parking lock bolt (3) is supported by a blind bore in the wall (11*a*) of the transmission housing (11) and an axially opposite end of the parking lock bolt (3) is supported by a bore of the carrier plate (7), and the parking lock pawl (2) is supported by the parking lock bolt (3) between the wall (11*a*) of the transmission housing (11) and the carrier plate (7);
- the carrier plate (7) comprises a guiding and supporting device (10) having a supportive bolt (10*a*), one axial end of the supporting bolt (10*a*) is supported by the carrier plate (7) and an axially opposite end of the supporting bolt (10*a*) is supported in the housing wall (11*a*); and
- the detent (5) abuts the supporting bolt (10*a*) and the parking lock pawl (2) when the parking lock pawl (2) is in the engaged condition.

11. The parking lock device according to claim 10, wherein a spur drive gear (6) is arranged coaxially with and adjacent to the parking lock gearwheel (1), the spur drive gear (6) has a diameter that is larger than a diameter of the parking lock gearwheel (1), the parking lock pawl (2) and the carrier plate (7) are arranged radially outside the parking lock gearwheel (1) and axially adjacent the spur drive gear (6), and the carrier plate (7) is arranged axially between the parking lock pawl (2) and the spur drive gear (6).

12. The parking lock device according to claim 11, wherein axes of the fixing bolts (8, 9) define a plane, and the parking lock bolt (3) is arranged such that, from a point of view facing normal to the plane, the parking lock bolt (3) is between the fixing bolts (8, 9).

13. The parking lock device according to claim 12, wherein the axes of the fixing bolts (8, 9) and an axis of the parking lock bolt (3) are parallel to one another.

14. The parking lock device according to claim 11, wherein the parking lock bolt (3) is positioned radially inside a diameter of the spur gear (6) and radially outside a diameter of the parking lock gearwheel (1) from a point of view on an axis of the spur drive gear (6) and the parking lock gearwheel (1).

15. The parking lock device according to claim 10, wherein the axes of the fixing bolts (8, 9), the axis of the parking lock bolt (3) and an axis of the supporting bolt (10*a*) are each parallel to one another.

\* \* \* \* \*